United States Patent [19]

Stadnik

[11] 4,454,568
[45] Jun. 12, 1984

[54] LIGHT PATTERN GENERATOR

[75] Inventor: George O. Stadnik, Worcester, Mass.

[73] Assignee: Interactive Entertainment Corp., Worcester, Mass.

[21] Appl. No.: 358,474

[22] Filed: Mar. 15, 1982

[51] Int. Cl.³ .............................................. F21V 7/04
[52] U.S. Cl. .................................... 362/32; 362/280; 362/281; 362/293; 362/307; 362/319; 362/320; 362/321; 362/806; 362/811
[58] Field of Search ................. 362/32, 280, 281, 293, 362/307, 319, 320, 321, 806, 811

[56] References Cited

U.S. PATENT DOCUMENTS

| 1,891,216 | 12/1932 | Hough | |
|---|---|---|---|
| 3,600,076 | 8/1971 | Snyder | 353/20 |
| 3,757,106 | 9/1973 | Bau et al. | 362/811 |
| 3,943,815 | 3/1976 | Gilbert | 84/293 |
| 3,958,113 | 5/1976 | Termohlen | 240/1 |
| 4,034,215 | 7/1977 | Hashimoto | 240/10 |
| 4,123,172 | 10/1978 | French | 362/32 |
| 4,171,882 | 10/1979 | Johnson et al. | 353/1 |
| 4,196,461 | 4/1980 | Geary | 362/811 |
| 4,206,494 | 6/1980 | Lovering | 362/32 |

Primary Examiner—Stephen J. Lechert, Jr.
Attorney, Agent, or Firm—Blodgett & Blodgett

[57] ABSTRACT

Generator having a light source of high intensity which is passed through colored filters and into fiber optic bundles, the ends of the bundles being moveable relative to a kaleidoscope-type projecting lens.

10 Claims, 11 Drawing Figures

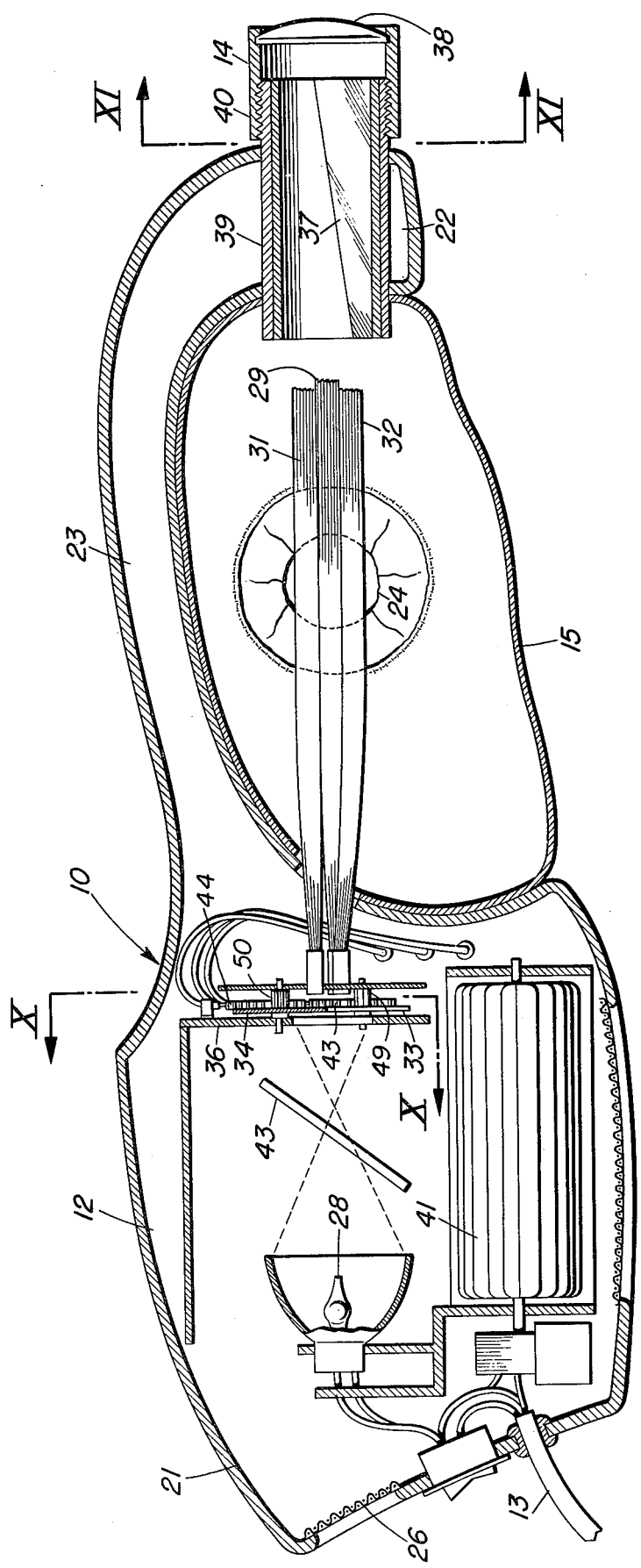

LIGHT PATTERN GENERATOR

BACKGROUND OF THE INVENTION

It is common practice to use colored light effects to accompany the playing of music. This is particularly true in the case of modern music, in which case the light and visual effects may be quite complex. However, such effects are usually carried out by an operator who is located away from the stage and usually has very little to do with the tempo, tone, or mood of the music. Attempts have been made in the past to generate the visual effects closer to the musicians who play it, as for instance, by controlling the light effects from the playing of a piano or by relating the effects to an electronic organ of some kind. However, these light effects fail to satisfy the requirement that the producer of the effects be working on the stage and close to the musicians who produce the audio effects. Also, it has been difficult to produce varied and unusual patterns of light. These and other difficulties experienced with the prior art devices have been obviated in a novel manner by the present invention.

It is, therefore, an outstanding object of the invention to provide a light pattern generator which is portable and capable of being used on the stage.

Another object of this invention is the provision of a light pattern generator having the appearance of a musical instrument that can be operated by a performer as though he was playing a guitar.

A further object of the present invention is the provision of pattern generator capable of producing an infinite number of light patterns from a device which may be simply plugged into a conventional electrical outlet.

It is another object of the instant invention to provide a light pattern which lends itself to imaginative operation by a performer in the same manner as a musician playing on a musical instrument.

A still further object of the invention is the provision of a light pattern generator which is simple in construction, which is inexpensive to manufacture, and which is capable of a long-life of useful service with a minimum of maintenance.

SUMMARY OF THE INVENTION

In general, the invention consists of a light pattern generator having a main body with a light source located at a first position in the main body and a light-projecting element located at a second position in the main body, which second position is substantially spaced from the first position. A bundle of optical fibers is mounted in the main body with one end located in a fixed position adjacent the light source and the other end being free and adapted to be positioned adjacent the element. A shield is mounted on the said main body between the said first and second positions and surrounds the bundle of optical fibers while permitting access for the manipulation of the said other end of the optical fibers.

Specifically, the said light-projecting element is provided with a kaleidoscope mirror system and a projection lens. A color filter is provided associated with one end of the bundle of optical fibers, the filter being selectively capable of passing any one of a plurality of colors. A selector element operable from the exterior of the main body can be manipulated to select a desired color. The shield consists of a flexible opaque bag which is provided with a light-tight opening permitting the user to have access to the optical fiber bundle with one hand, which he operates the said selector elements with the other hand.

BRIEF DESCRIPTION OF THE DRAWINGS

The character of the invention, however, may be best understood by reference to one of its structural forms, as illustrated by the accompanying drawings, in which:

View 1 is a prospective view of a light-pattern generator incorporating the principles of the present invention, shown in use by a performer, FIG. 9 is a sectional view of the generator taken on the line IX—IX of FIG. 7.

DESCRIPTION OF THE PREFERRED EMBODIMENT

Figure 1:
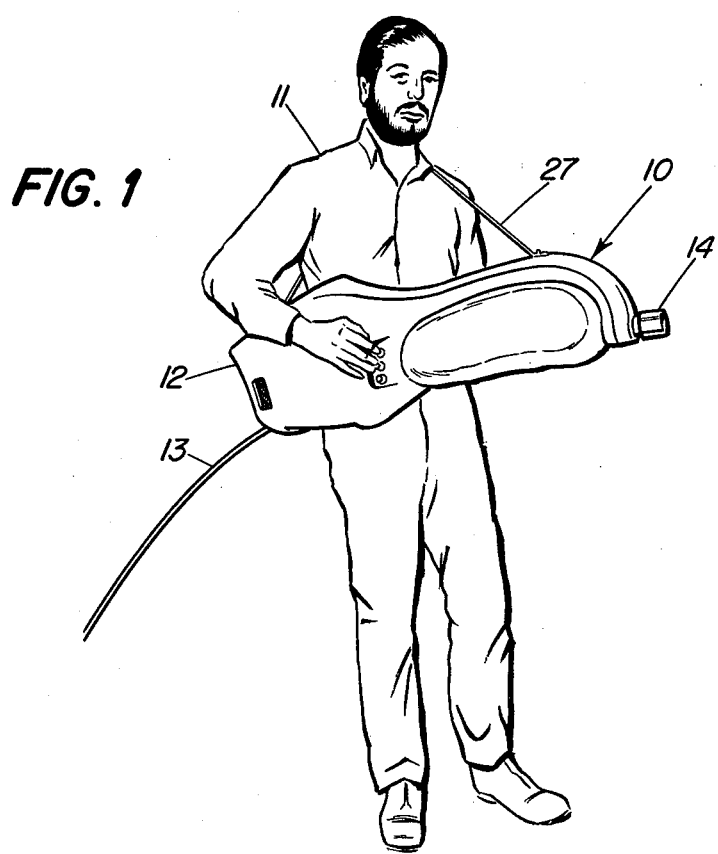

Referring first to FIG. 1, which best shows the general features of the invention, it can be seen that the light-pattern generator, indicated generally by the reference number 10, is shown in use by a performer 11. The generator has a main body 12 from one end of which extends a power cord 13, while a light-projecting element 14 extends from the other end. A strap 27 is provided to support the generator on the performer's shoulders, so that both hands are free to play the generator.

Figure 2:
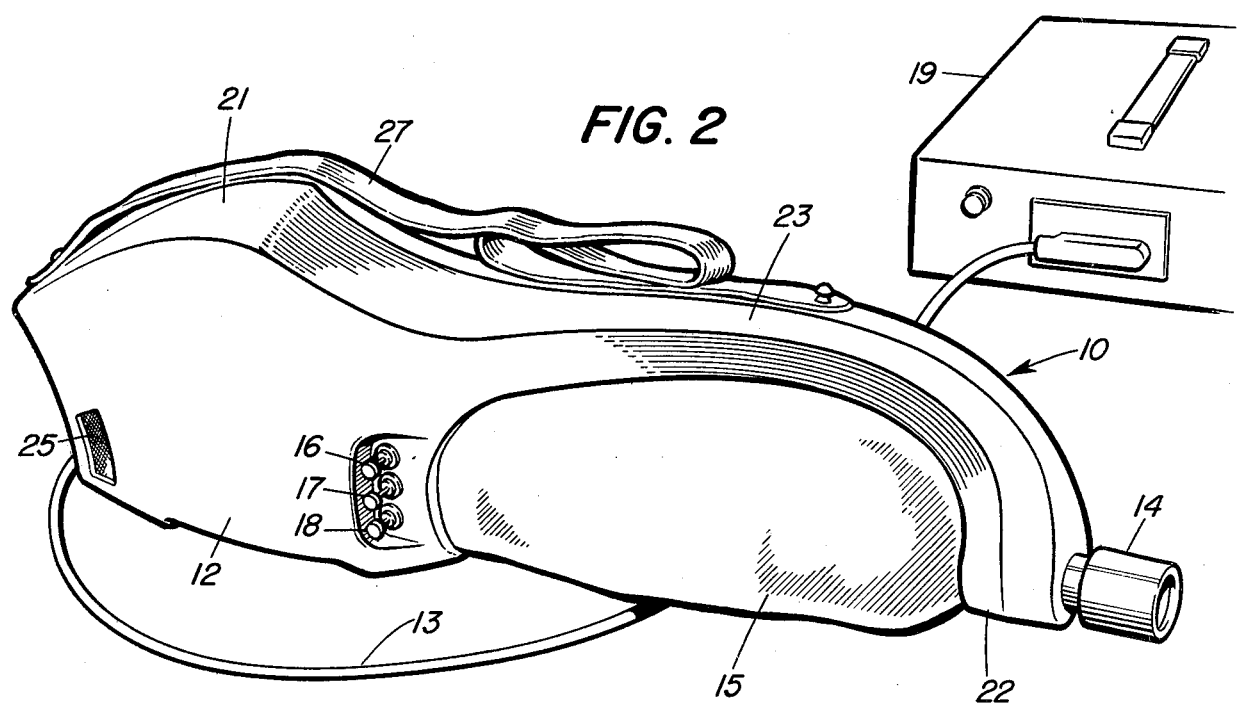
FIG. 2 is an enlarged prospective view of the generator showing it connected to a power supply.

Referring next to FIG. 2, it can be seen that the main body 12 of the generator is elongated and hollow and consists of a first housing 21 at one end and a second housing 22 at the other end. A bridge 23 joins the two housings, while a shield 15 extends between the first and second housings and underlies the bridge 23. The generator is connected to a power supply 19 which is provided for supplying high-voltage, direct current electricity through the cord 13. Located on the face of the housing 21 is an air vent 25 as well as selector buttons or elements 16, 17, and 18.

Figure 3:
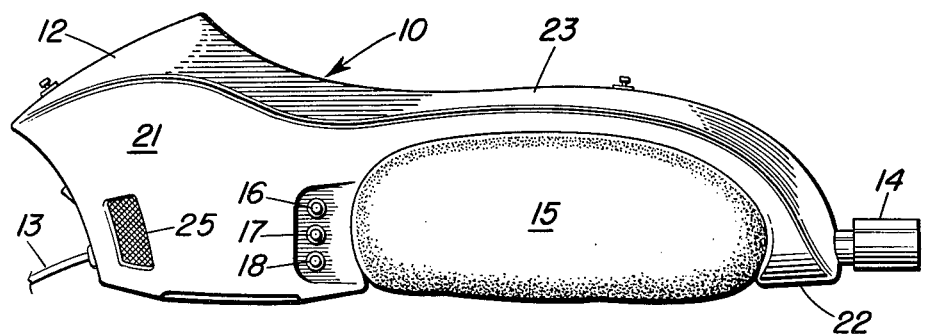
FIGS. 3-8 are front elevation, rear elevation, top plan, bottom plan, right-hand end elevation, and left-hand end elevational views of the generator, respectively.
Figure 4:
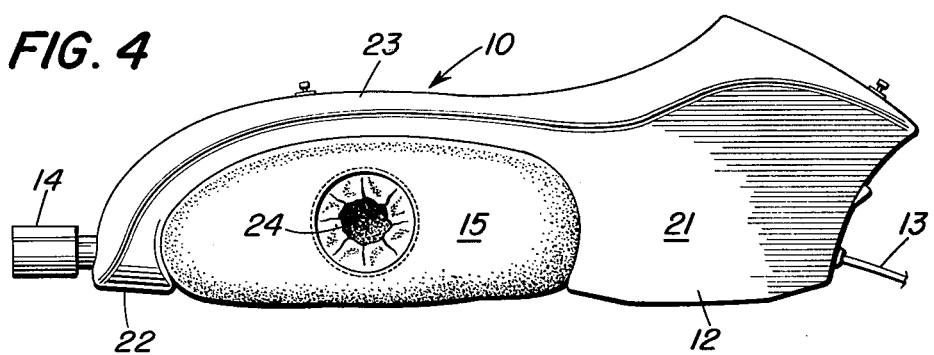
Figure 5:
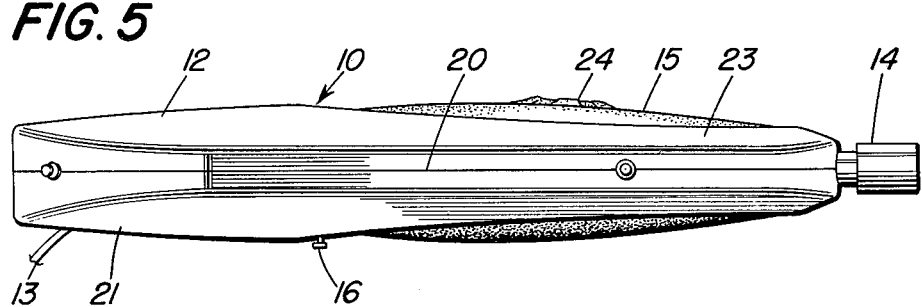
Figure 6:
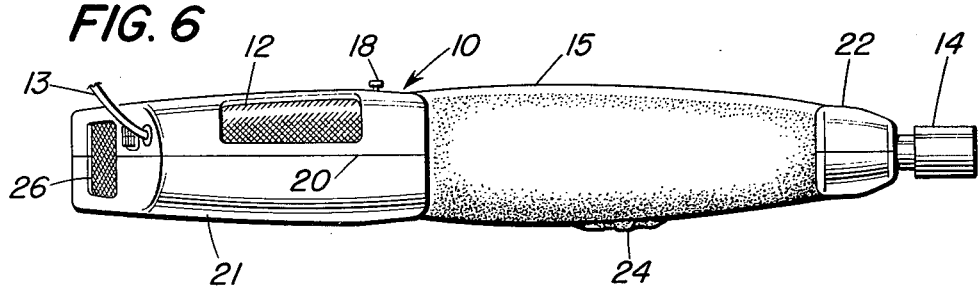
Figure 7:
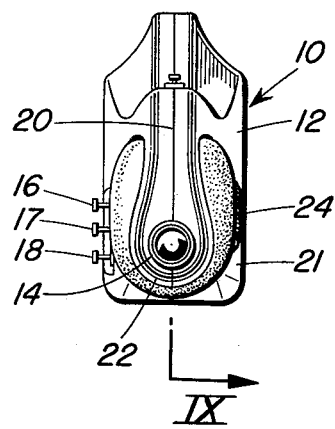
Figure 8:
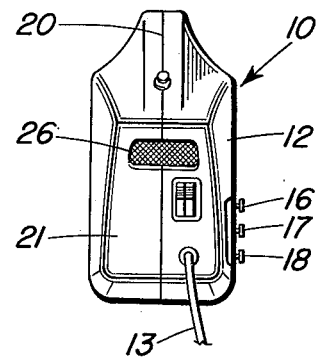

FIGS. 3-8 show the general configuration of the generator 10. It is clear from these drawings that the main body 12 is formed of two shell-like halves joined together along a seam 20. Particularly evident in FIG. 3 is the shape of the space that lies between the first housing 21 and second housing 22 and is defined by the bridge 23; this space is generally oval-shaped and the shield 15 is similarly shaped. In FIG. 4 can be seen a light-tight opening 24 to the shield and it can be seen that another air vent 26 is provided. Generally speaking, the invention has the shape of a guitar, the housing 21 being much thicker and larger and joined by the narrow bridge 23 to a much smaller second housing 22.

FIG. 9 best shows the details of the operating mechanism of the generator. A light source 28 is mounted in the first housing 21 of the main body 12 and is connected by the cable 13 to the power supply 19 (not shown). As has been stated before, the light-projecting element 14 is located in the second housing 22 and, therefore, is spaced a substantial distance from the first housing 21. Three bundles 29, 31, and 32 of optical fibers are carried in the main body, each having one end located adjacent the light source 28 and another end which is free and capable of being positioned adjacent the element 14. The shield 15 lies between the first housing 21 and the second housing 22 and under the bridge 23. It surrounds the optical bundles 29, 31, and 32 of optical fibers, while permitting access of the operator's hand through the opening 24 for the manipulation and movement of the said other end adjacent the light-emitting element 14.

A light filter is associated with the fixed end of each of the bundles 29, 31 and 32. More specifically, a first light filter 33 is associated with the bundle 29, a second light filter 34 is associated with the bundle 31, and a third light filter 35 is associated with the bundle 32. All the filters and bundles are connected to and supported by a support member 36. Each of the filters 33, 34, and 35 is selectively capable of passing any one of a plurality of colors, because of color sections which vary from red on one end of the color scale to purple on the other end. These filters are in the form of wheels which are rotatably mounted on the support member 36 and can be manipulated by the selector elements 16, 17 and 18 which are operatively connected to gear racks 43, 44, and 45, respectively, through push-pull cables 46, 47, and 48, respectively. The racks 46, 47, and 48 are drivingly engaged with gear teeth 49, 50, and 51, respectively formed on the outside of the filters 33, 34, and 35, respectively. The filters 33, 34, and 35 are rotated to different positions by selectively pressing, and pulling the selector elements 16, 17, and 18, respectively. As is also evident in FIG. 9, the light-projecting element 14 is provided with a kaleidoscope mirror system 37 and a projection lens 38. The mirror system 37 is mounted in an inner barrel 39 which is fixed to the main body 12 while the lens 38 is carried in an outer barrel 14 which is threadedly mounted on the inner barrel and, therefore, can be adjusted lengthwise relative thereto.

Figure 11:
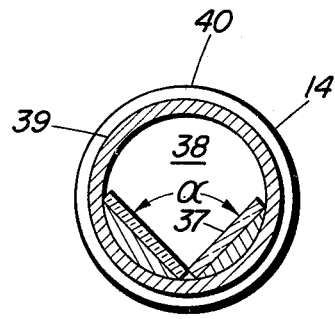
FIG. 11 is a vertical sectional view of the generator taken on the line XI—XI of FIG. 9.

As is evident in FIG. 11, the mirror system 37 consists of two mirrors carried at an angle which is the preferred embodiment is approximately 57½°, the mirrors being backed by a cushioning material.

Figure 10:
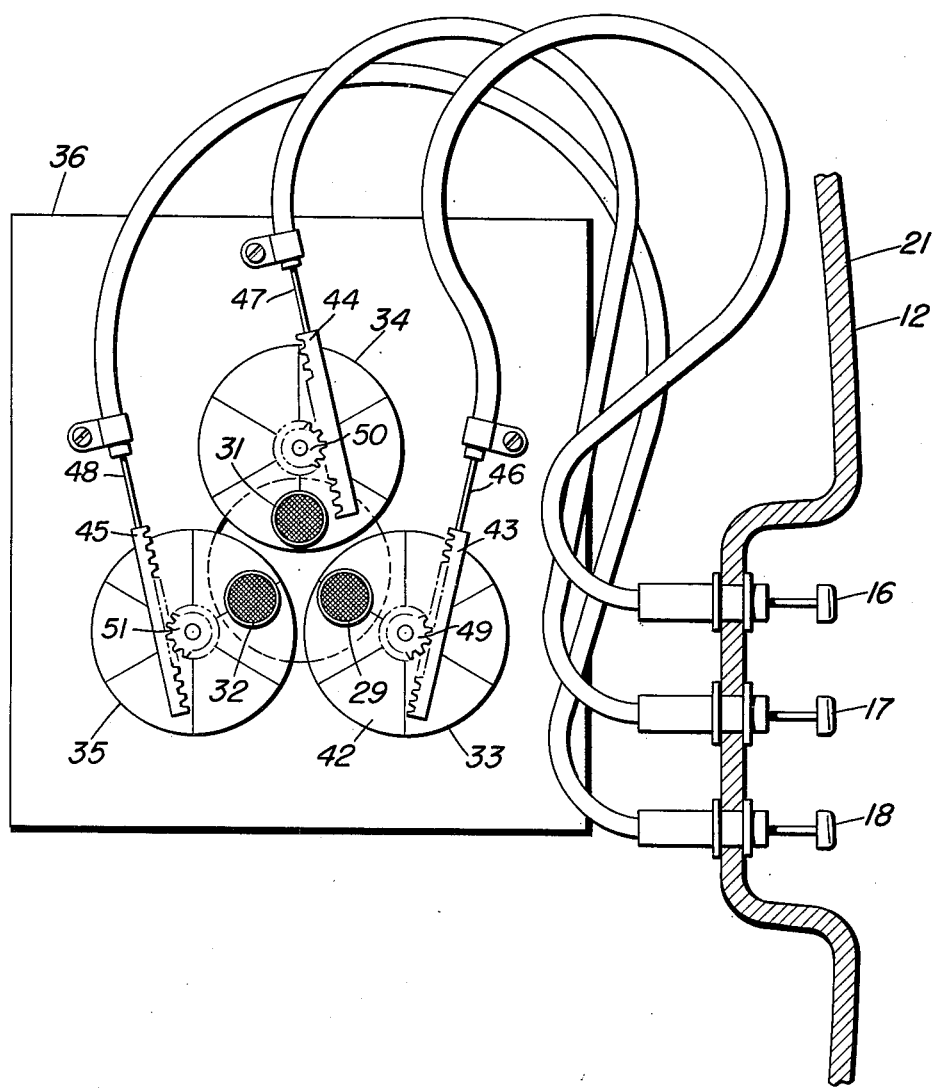
FIG. 10 is a sectional view of the generator taken on the line X—X of FIG. 9.

FIG. 10 shows the manner in which the selector elements 16, 17, and 18 operate the racks 43, 44, and 45 which engage the gear teeth 49, 50, and 51, respectively which are teeth formed on the outer periphery of the wheel-like filters 33, 34, and 35, respectively. These mechanisms serve to bring the various colors in the color section 42 into play with the fixed ends of the fiber optic bundles 29, 31 and 32. It should be pointed out that the shield 15 consists of a bag formed of black cloth which is fastened into the somewhat oval-shaped space defined by the first housing 21, the second housing 22, and the bridge 23. A cooling fan 41 is mounted in the first housing 21 and serves to take heat away from the light source 28.

In a commercial version of the invention, the light source 28 is a General Electric MARC, high intensity arc projection lamp, Model 350/16T. It is joined by the cable 13 to the power supply, which is a General Electric MARC power supply, Model #9T 68Y 4063G3. The light-projecting element 14 is a kaleidoscope projector lens sold under the trade name "Optikinetic" and is manufactured in England. The color sections 42 on the filters 33, 34, and 35 are of the type known as "dichroic" filters, which have the ability to pass visible light through the filter into the optical fiber bundles, while restricting the passage of infrared light. A dichroic mirror 43 of this same nature is interposed between the light source 28 and the filters. This means that the heat stays out of the fibers which, in the preferred embodiment, are made of plastic and could be easily damaged by heat. The fibers are a combination of a styrene plastic core surrounded by an acrylic coating. Each fiber is 0.040 inches thick in each strand and there are a total of 94 strands in each of the bundles 29, 31, and 32. These fibers are made by the Welsh Allen Co. of Skaneatlles, N.Y.

The operation and advantages of the invention will now be readily understood in view of the above description. In order to use the generator 10, the power supply 19 is plugged into an ordinary 60-cycle, 110-volt AC current source. It produces a high voltage DC current which is passed through the cable 13 to the light source 28. This high intensity lamp produces a very strong, white light which passes through the color sections 42 into the fiber optic bundles 29, 31, and 32, the color depending on the selection which has been made by selectively pulling and pressing the selector elements 16, 17, and 18. The performer 11 carries the instrument in front of him with the strap 27 over his shoulder. His left hand would be inserted through the opening 24 in a light-tight manner, so that he can grasp the three bundles 29, 31, and 32. His right hand would manipulate the selector elements 16, 17, and 18 to select the colors that are introduced into the fiber optics. The light leaves the free ends of the bundles and impinges on the opening to the light-projecting elements 14. More specifically, the patterns of colored light leaving the ends of the bundles strike the kaleidoscope mirror system 37 and produce a pattern which then travels through the projecting lens 38 onto a surface toward which the generator is directed. Usually, a white surface would be selected to review the projected image and the room in which the playing takes place would have a lowered light level. Any change in position of the free ends of the fiber bundles 29, 31, and 32 with respect to the kaleidoscope mirror system 37 produces a change in the pattern which is projected through the lens 38. Manipulatioin of the fiber bundles 29, 31, and 32 with the left hand causes the free ends of the fiber bundles to change position with respect to the kaleidoscope mirror system 37. This causes an infinite number of interesting patterns to be formed and the change of the patterns can be correlated with the rhythm of the music. In the hands of a skilled performer, the mood and nature of the music can also be demonstrated by a proper selection of the color filters 33, 34, and 35 to correspond to the music.

As can be seen, the light pattern generator of the invention can be used for an entertainment device that is portable and which can be carried out onto the stage with all of its own associated equipment. The performer would stand on the stage beside the other musicians; in the case of modern music, where guitar players stand at the front of the stage, he would join them as though he were playing the guitar. However, instead of playing music, he would project the changing color light patterns on a selected surface adjacent the stage.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Light pattern generator, comprising:
   (a) a main body,
   (b) a light source located at a first position in the main body,
   (c) a light-projecting element located at a second position in the main body, which second position is substantially spaced from the first position,
   (d) a bundle of optical fibers mounted in the main body with one end located adjacent the light source for receiving light from said light source and the other end being adapted for transmitting said light to said element said other end being manipulable relative to the element for varying the light which is transmitted from said other end to said element, and
   (e) a shield mounted on the said main body between the said first and second positions and surrounding the optical fibers while permitting access for the manipulation of the said other end of the optical fibers.

2. Light pattern generator as recited in claim 1, wherein the optical fibers are grouped into a plurality of bundles, and wherein a light filter is associated with the said one end of each bundle.

3. Light pattern generator as recited in claim 2, wherein each said filter is selectively capable of passing any one of a plurality of colors, and wherein a selector element operable from the exterior of the main body can be manipulated to select a desired color.

4. Light pattern generator as recited in claim 1, wherein the said light-projecting element is provided with a kaleidoscope mirror system and a projection lens.

5. Light pattern generator as recited in claim 1, wherein the light source is a high intensity, arc lamp, and wherein a power supply is provided for supplying a high voltage DC electricity to the lamp.

6. Light pattern generator as recited in claim 3, wherein the main body is elongated and hollow, wherein the main body consists of a first housing at one end in which the light source is mounted a second housing at the other end in which the light-projecting element is mounted, and a bridge joining the two housings, and wherein the shield is a flexible opaque bag underlying the bridge and joining the two housings.

7. Light pattern generator as recited in claim 6, wherein the opaque bag is provided with a light-tight opening permitting the user to have access to the optical fiber bundles with one hand, and wherein the selector elements extend from the first housing for operation by the user's other hand.

8. Light pattern generator as recited in claim 1, wherein a cooling fan is mounted adjacent the light source for operation while the light source is energized.

9. Light pattern generator as recited in claim 2, wherein the light filter has a plurality of color sections, and wherein means is provided to cause visible light to pass through the filter into the optical fibers, while restricting the passage of infrared light.

10. Light pattern generator, comprising:
    (a) a light source located at a first position,
    (b) a kaleidoscope system with a projecting lens located at a second position substantially spaced from the light source,
    (c) a plurality of color filters located adjacent the light source and between the system and the source, and
    (d) a bundle of optical fibers extending between the filters and the system, one end of the bundle being fixedly mounted adjacent the filters and the other end of the bundle being free for manipulation close to the system.

* * * * *